UNITED STATES PATENT OFFICE.

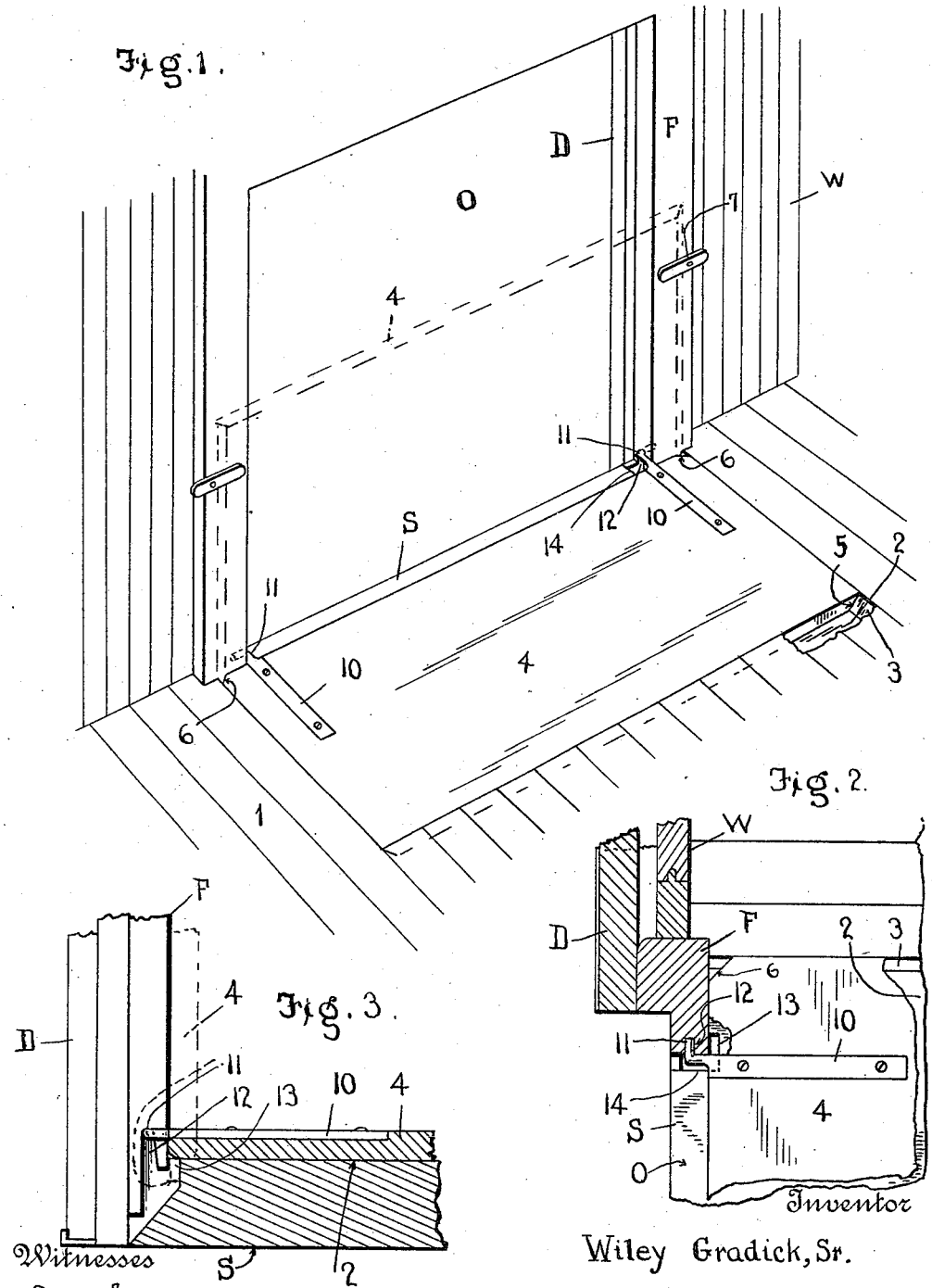

WILEY GRADICK, SR., OF TYLER, TEXAS, ASSIGNOR OF ONE-HALF TO WOLDERT GROCERY CO., OF TYLER, TEXAS.

GRAIN-DOOR.

1,045,278.  Specification of Letters Patent.  Patented Nov. 26, 1912.

Application filed May 23, 1912. Serial No. 699,190.

*To all whom it may concern:*

Be it known that I, WILEY GRADICK, Sr., a citizen of the United States, residing at Tyler, in the county of Smith and State of Texas, have invented certain new and useful Improvements in Grain-Doors; and I do declare the following to be a full, clear, and exact description of the invention, such as will enable others skilled in the art to which it appertains to make and use the same.

This invention relates to car doors, and more especially to those adapted particularly for grain or other cereals; and the object of the same is to produce an improved grain car door covering the lower portion or half of the door opening when the door is in closed position and positively preventing it from being opened, and completely uncovering the door opening when the door is in opened position, and yet which door may be removed at times when necessary. This and other objects are accomplished by constructing the door in the manner hereinafter more fully described and claimed, and as shown in the drawings wherein—

Figure 1 is a perspective view of this improved grain door, viewed from the interior of a freight car and showing the door as opened; Fig. 2 is a horizontal section taken just above the sill; Fig. 3 is a vertical section taken just inside one side bar of the frame.

In these views the letter W designates the wall of a car having the usual door opening O surrounded by a frame F, and D is the ordinary outside door adapted to be slid or swung over the door opening from the exterior of the car and secured in place in any suitable manner forming no part of the present invention.

The improved grain door forming the gist of this invention is designed in the present instance to cover the lower half of the door opening O, than which it is wider so that its ends rest against the frame F from the inside and therefore the door cannot possibly be pushed outward under the weight of the grain contained within the car, so long as it is not moved aside in either direction.

Coming now more particularly to the details of the present invention, the floor 1 of the car is recessed opposite the door as at 2, the edges of the recess being preferably beveled as at 3 on lines transverse to the length of the car and opposite the frame F; and the door 4 is of a height to cover approximately half the door opening O when the door is closed, and of a length sufficient to fill said recess when the door is opened, its ends 5 being undercut or beveled to make a close fit against the bevels 3 at the opposite edges of said recess. When open the door lies in the recess and its then upper face is flush with the upper face of the car floor 1; when closed, the door stands on edge and its ends rest against the inner faces of the side bars of the frame F. In order that even then it may rest closely in contact with the door sill S, its corners are beveled off as at 6 so that the bevels 3 in the car floor may be carried completely up to the frame F.

To hold the door in its vertical or closed position, any suitable form of latch 7 may be employed, and the same is preferably applied to the inner face of one of the side bars of the frame as shown. I have shown this latch conventionally as consisting of a hook, which is merely illustrative of the latch, and of course the latter may have any suitable form.

The construction above described will be ample under ordinary circumstances, but in order that by no possible accident the door may become displaced from its correct position, either when opened or closed, I make use of the following additional details of construction: Secured across what would be the upper face of the door body when the same is open are two strap members 10, their extremities being projected beyond the outer edge of the door and hooked away from each other as shown at 11; and these straps are disposed just such a distance apart that their outer edges stand in line with the inner edges of the side bars of the frame F, while the bills of the hooks project outward beyond such lines. The inner faces of said side bars of the frame are recessed vertically as at 12 to receive said hooks, the recesses continuing downward below the upper face of the sill and opening out through the inner faces of the side bars of the frame as at 13; and opposite said recesses and their openings the sill is also recessed as at 14. This structure permits the door as a whole to be brought into position slightly above the sill and with its ends close against the side bars, then moved downward so that the bills of the hooks pass through the openings in the floor and sill, and then the upper edge of the door moved inward toward the center of the car. This movement throws the bills outward through the notches or recesses 13 in the side bars, and then upward into the vertical recesses 12; and when in that position it is impossible to move the door either inward, outward, or longitudinally in either direction, and it is also impossible to raise the outer edge of the door. Yet the inner edge of the door may be raised and latched as above described, and during this movement the bills of the hooks travel downward in the recesses 12 and thence inward into the recesses 13, and yet then it is impossible to move the door inward or outward or longitudinally although it may be lifted out of place. Thus is produced what might be called a pair of separable hinges whereof the strap-iron pieces on the door form one member and the recesses in the door frame and sill constitute the other member, and there are two such hinges as will be seen from the drawings.

The car in so far as it is connected with this door will doubtless be entirely of wood, although that is not essential. The body of the door is also preferably of wood, and the strap pieces constituting the hinges are of metal. The size and proportion of parts is immaterial to the present invention. In use, a car provided with this door may be employed as usual by simply closing the door, then lifting it out of place, and removing it; and the door D will serve to close the door opening. When now it is desired to use this car for grain and other cereals or granular matter, the door is put into place by bringing it into position against the side bars of the door frame F, then dropping it so that the hooks 11 pass downward through the openings or recesses 14 in the sunken car floor, and then moving the upper edge of the door inward toward the center of the car so that its beveled ends 5 fall into the bevels 3 in the car floor and the body of the door drops into the recess 2, during which movement the bills of the hooks will rise into the recesses 12 in the inner edges of the door frame F. Thereafter the now upper face of the door stands flush with the upper face of the car floor, and the same may be used as usual. If the car be wider than the height of the door opening, there will be two recesses 2 in its floor and their inner ends will be separated by a raised strip flush with the remainder of the floor; or, if the half-door commonly known as "grain doors" are each as high as half the width of the car floor, then the recess 2 will extend completely across the car from sill to sill. When it is desired to close the lower half of the door opening, the grain door is raised and latched as at 7, and during this movement the bills 11 of the hooks pass downward and then inward into the innermost recesses 14 in a manner above described. While it is closed the extremities of the door rest against the inner faces of the car frame F, and the hooks prevent the dislocation laterally or longitudinally of the car as will be clearly understood.

What is claimed as new is:—

In a frame door, the combination with a freight car having a door opening surrounded by a frame and a depression in its floor opposite said opening, there being a recess in the inner edge of each side bar of the frame extending from a point above the sill downward in the side bar and the sill and opening thence inward through the inner face of the latter and upward through the floor; of a grain door of a size to fill said depression when standing horizontal and to overlap the side bars of the frame when standing vertical, and a pair of strap members secured across the upper and outer face of the door and extended into hooks whose bills are turned away from each other and adapted to removably engage said recesses, substantially as described.

In testimony whereof I have hereunto set my hand in presence of two subscribing witnesses.

WILEY GRADICK, Sr.

Witnesses:
 ALEX WOLDERT,
 JANET CALDWELL.

Copies of this patent may be obtained for five cents each, by addressing the "Commissioner of Patents, Washington, D. C."